May 14, 1957 J. A. RAJCHMAN 2,792,563

MAGNETIC SYSTEM

Original Filed Nov. 25, 1952 2 Sheets-Sheet 1

INVENTOR.
Jan A. Rajchman

BY Morris A. Rabkin

ATTORNEY

May 14, 1957 J. A. RAJCHMAN 2,792,563

MAGNETIC SYSTEM

Original Filed Nov. 25, 1952 2 Sheets-Sheet 2

INVENTOR.

Jan A. Rajchman

BY Morris A. Rahan

ATTORNEY

United States Patent Office 2,792,563

Patented May 14, 1957

2,792,563

MAGNETIC SYSTEM

Jan A. Rajchman, Princeton, N. J., assignor to Radio Corporation of America, a corporation of Delaware Continuation of application Serial No. 322,491, November 25, 1952. This application February 1, 1954, Serial No. 407,200

15 Claims. (Cl. 340—174)

Figure 2:
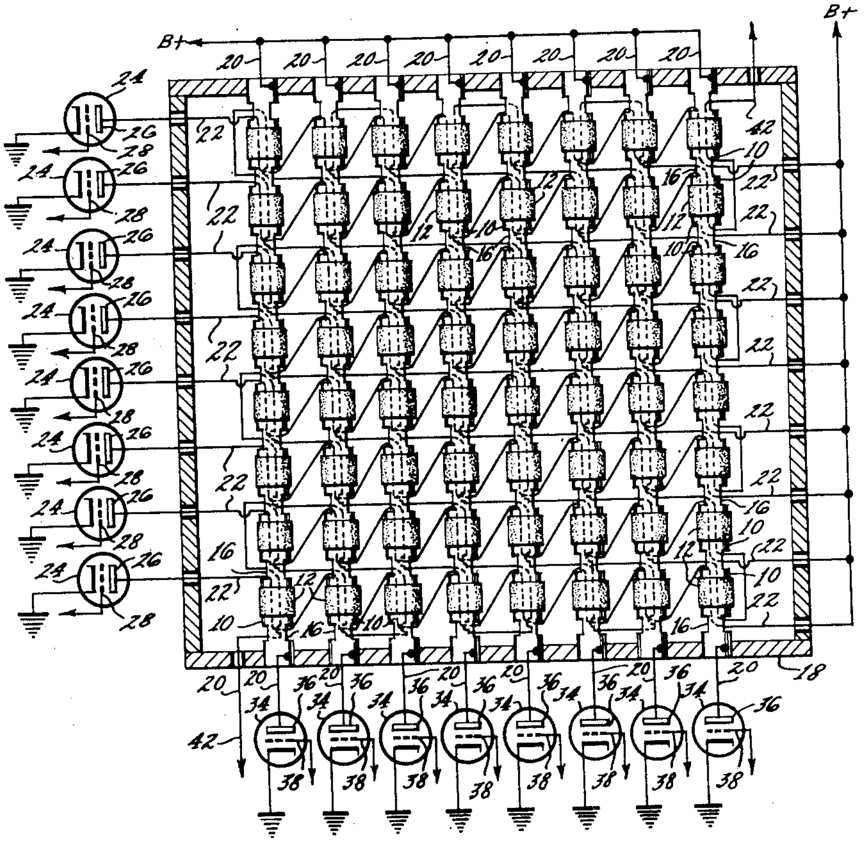

This invention relates to information handling systems, and more specifically to an improved construction for such a system, for example for a random access type of magnetic matrix memory for such machines.

This is a continuation of my co-pending application Serial No. 322,491, filed November 25, 1952, and now abandoned, entitled Magnetic Memory System.

There has been described, in an article by Jay W. Forrester, in the Journal of Applied Physics for January 1951, page 44 et seq., and by J. A. Rajchman, in an article in the RCA Review for June 1952, vol. XIII, No. 2, entitled "Static Magnetic Matrix Memory and Switching Circuits," a digital information storage system using magnetic cores. As therein described, the system comprises a plurality of toroidal cores of magnetic material which may be arranged in a two-dimensional storage array or in a three-dimensional storage array. These cores, when arranged in a two-dimensional array in columns and rows, have a separate coil inductively coupled to all of the cores in each row. A column coil is inductively coupled to all the cores in a column. The cores are selected to preferably have a substantially rectangular hysteresis characteristic. In order to "write" into any of the cores, a row and column coil are selected, to which the desired core is coupled. A current excitation is applied to each of the selected coils which is less than the critical excitation required to drive a core to saturation. Accordingly, only the core at the intersection of the selected coils will receive a magnetomotive driving force in excess of the critical value required to drive it to saturation. All other cores coupled to the excited row and column coils receive less than the critical value and remain substantially unchanged or in whatever their previous polarity or saturation was. Thus, by selective excitation any core can be chosen and be driven to have a desired polarity of saturation. In order to read the condition of any core, there is provided a reading coil which is a coil inductively coupled to every core in the memory. For the purpose of reading, an excitation is applied to the selected core, always in one direction only. Accordingly, if the saturation of such core is in the same polarity as the drive of the reading driving currents, no output is obtained. If its polarity is opposite to that of the reading driving currents, a pulse is induced in the reading coil when the core is turned over.

Description is also found in the Forrester article of a three-dimensional storage array, but for the purpose of understanding the present invention the above described two-dimensional array suffices.

Another and further description of the use of the magnetic cores for the storage of digital information is found in an article by William N. Papian, in the Proceedings of the I. R. E. for April 1952, on page 475. Great interest is being shown in the further development of magnetic matrix memories of the types indicated in view of the fact that the data storage is substantially random, as is the access to the stored information. There is no requirement for critically operating deflection circuits, as is found with cathode ray tube types of storage, and further, there is no requirement for power for retaining the information in storage.

The size of the cores which are presently being employed for these magnetic memories is on the order of a 1½ millimeters outside diameter and 1 millimeter inside diameter. It will readily be appreciated that difficulties are present in the handling of cores of such size. Most especially is this true when it is desired to make a memory having anywhere from 10 to 100,000 cores. The problem of individual handling of these cores for testing, for threading the row coils and the column coils as well as the reading coil through the center opening of these cores, besides being tedious and difficult, makes the construction of large core arrays extremely expensive.

An object of the present invention is to provide a magnetic matrix memory which eliminates the individual core handling problem.

It is a further object of this invention to provide a magnetic system which is less expensive and simpler to fabricate.

These and other objects of the invention are achieved in constructing a magnetic matrix memory as follows:

A plurality of tubes made of a substantially non-magnetic material and preferably of a conducting material have deposited thereon, either by plating or evaporation, or any other known technique, a plurality of rings of magnetic material each of which has the desired hysteresis characteristic. Each ring on the tube is spaced from another longitudinally along said tube. In the spaces between the rings, holes or perforations, which are opposed, are made. The tubes are aligned, if desired, and a plurality of row coils are coupled inductively to the plurality of rows of rings formed by the alignment of the tubes. The column coils are formed by the conductive tube material. Another reading coil is inductively coupled to all the rings on all the tubes.

Operation of this memory is identical with that described in any of the above mentioned articles, namely, selection of a desired ring is provided by selecting a row coil and a column coil which intersect the desired core.

Figure 1:
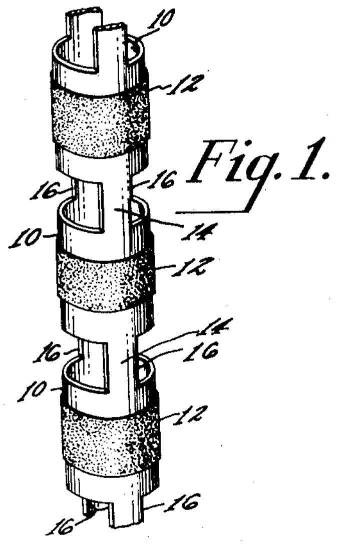
Figure 1A:
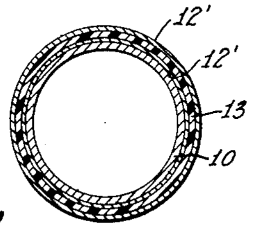
Figure 3:
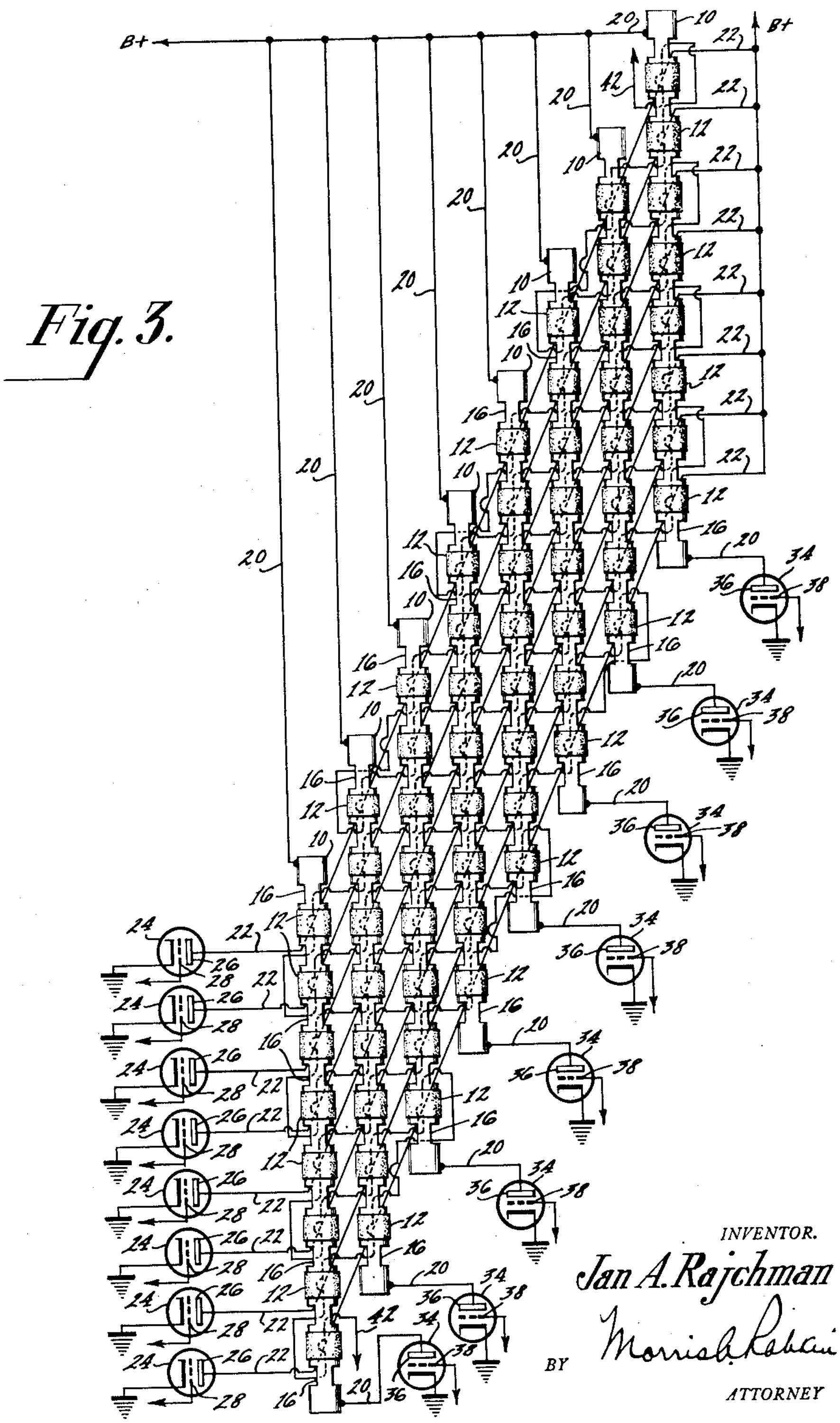

The novel features of the invention, as well as the invention itself, both as to organization and method of operation, will best be understood from the following description, when read in connection with the accompanying drawing, in which Figure 1 is a perspective drawing of a unit comprising a column of rings mounted on a tube, Figure 1A is a transverse cross-sectional view of a modification of the unit of Fig. 1, Figure 2 is a diagram of a magnetic matrix memory embodying the present invention, and Figure 3 is a second suggested arrangement for a magnetic matrix memory embodying the present invention.

Referring to Fig. 1, there is shown a unit for a magnetic matrix memory. This consists of a hollow tube, made of a non-magnetic and preferably conducting material. Spaced along the length of the tube are seen rings of magnetic material. These may comprise a single layer, or a plurality of layers 12′ or wraps each separated by a layer of non-conductive, non-magnetic insulating material 13, as shown in Fig. 1A. The rings 12 may be deposited on the tube either by electroplating, or evaporation. Such depositing may be made selectively to provide the rings with the spaces 14 between them by coating the tube so that no magnetic material is deposited in the spaces between rings. If the method of depositing chosen is plating, then the spaces 14 are produced by masking during the plating process. Alternatively, however, the entire tube can be plated or have the magnetic material deposited thereon and the plating may be selectively removed from the places where the spaces are desired.

The cylindrical tube has perforations or cuts 16 on opposite sides in the spaces between the rings.

The plated magnetic material should preferably have substantially square hysteresis characteristics as well as a reasonably low coercive force. An example of a material which has desirable characteristics is an alloy such as a 50–50 Fe-Ni alloy. There may also be used an alloy of molybdenum, nickel and iron, or an alloy of chrome and nickel.

The rectangularity of the hysteresis characteristic of some materials is usually enhanced by heat treatment. Should heat treatment be necessary, the base material of the supporting tube must be capable of withstanding the heat-treating temperature. Another well-known method of improving loop rectangularity is to perform the plating operation in the presence of a magnetic field. Such magnetic field may be provided by passing a heavy current through a conductor which passes through the center of the tube. The effect of the current (D. C.) is to provide a magnetic field which is circumferential and is in the same direction as the pulsed operating field. Thereby a preferential direction to crystal growth and/or a preferential orientation to the magnetic domains is given.

The deposit of magnetic material is made very thin so as to minimize the effects of eddy currents while the magnetic matrix is being operated. Each of the tubes is plated with a number of cores corresponding to the number of rows of rings desired. This could be 100 for a 10,000 matrix array or 1000 for an array comprising a million elements.

Reference is made to Fig. 2, which shows an array of the units assembled into a magnetic memory having 64 rings. Each tube 10 is supported by a frame 18 of non-conducting and non-magnetic material. Column coils 20 are provided by the tube material itself. Thus the column coils 20 are coupled to each ring by a single turn winding. The row coils 22 are provided by wires, each of which, as shown in the drawings, enters one opening 16 in a tube adjacent a ring and comes out of the opening 16 in the tube wall which is on the other side of the ring and essentially diagonally opposite the first opening. The wire then is threaded through the next ring in the same manner and this is continued until all the rings in a row have been inductively coupled to the coil by means of one turn windings. The column coil coupling to each ring is essentially a one-turn coupling also. The row coils are brought out at one end to a source of B+ and at the other end to the anodes 26 of individual driving electron tubes 24. The column coils which include the tubes 10 are also brought out at one end of the supporting frame by separate leads which are connected to B+ and by separate leads at the other end which are connected to the anodes 36 of individual electron tubes 34. Selection for excitation of a column coil and row coil is made by exciting the grid 28, 38 of the tube for which the particular coil serves as a plate load.

A reading coil 42 is also provided. This coil is threaded through every ring 12 in the magnetic array. The reading coil 42 is threaded in a "checkerboard" fashion for the purpose of reducing the spurious outputs which can be obtained from non-selected rings when reading driving currents are applied to a selected ring employing the selected row and column coils.

Another construction for the magnetic matrix memory may be seen in Fig. 3. Similar functioning components have the same reference numerals applied. The advantage of the arrangement shown therein is that the row coils 22 are threaded through the apertures 16 in the tubes 10 in straight lines. However, they still pass through the rings so that there is a single turn inductive coupling made with each ring. The reading winding 42 is threaded as before, in such a manner as to reduce any spurious outputs. One end of the row coils 22 is brought out to the source of B+ and the other end is connected to individually associated vacuum tubes 24. Similarly, the column coils 20 have one end connected, via leads, to a B+ source and the other end, by other leads, to individually associated vacuum tubes 34.

If desired, the hollow tubes 10 may be made of a non-conductive material and the column coil may be formed by passing a wire through a tube. However, it is preferred to make a tube from a conducting material, since the problems of plating are diminished thereby and an extra wire is not required. The units of a magnetic memory may be arranged in any desired manner, the rectangular array being shown merely by way of an example. Furthermore, these units may be arranged in a three-dimensional array to be operated in the fashion described by Forrester in the above indicated article. Extra perforations may be provided for an inhibiting coil if desired, or alternatively, the reading winding, if wound in a non-noise canceling manner on the cores, may be used to provide the inhibiting coil function, and selection of a plurality of desired rings in a three-dimensional array may be made as previously described. Furthermore, it may be desirable to place the rings inside of the tubes instead of on the outside as shown heretofore. This is still considered within the scope of the present invention.

There has been shown and described above a simple, inexpensive construction for a magnetic matrix memory. The units of the memory, consisting of tubes with perforations and rings of magnetic material deposited thereon, permit easy and inexpensive handling and assembling into any desired magnetic matrix.

What is claimed is:

1. A magnetic matrix memory comprising a plurality of tubes each of which is made of an electrically conductive and substantially non-magnetic material, a plurality of rings of magnetic material placed on each of said tubes, each ring on a tube being spaced from another along said tube, each of said tubes having opposed openings in the spaces between said rings, a plurality of coils each of which is inductively coupled to a different ring on every tube, and a reading coil inductively coupled to every ring on every tube.

2. A magentic matrix memory as recited in claim 1, wherein each of said coils inductively coupled to said rings includes a wire passing into an opening in a tube on one side of a ring and out of the diagonally opposite opening on the other side of said ring to the next tube.

3. A magnetic matrix memory as recited in claim 1 wherein each of said plurality of rings is made of a plurality of layers of magnetic material.

4. A unit for a magnetic system comprising a tube made of electrically conductive and substantially non-magnetic material, and a plurality of rings of magnetic material deposited on said tube, each of said rings being spaced from the other along said tube, said tube having opposed openings in the spaces between said rings.

5. A unit for a magnetic system as recited in claim 4 wherein each said ring includes a plurality of layers of magnetic material separated by insulating, non-magnetic material.

6. A magnetic matrix memory comprising a plurality of tubes, each made of a non-magnetic material, each of said tubes having deposited thereon a plurality of rings of magnetic material, each of said rings being spaced from one another along a tube, each said tube having opposed perforations through the tube wall in the spaces between said rings, means to selectively apply magnetomotive forces to a desired ring to drive it to a desired saturation polarity, and means to detect the saturation polarity of a desired ring.

7. A magnetic matrix memory as recited in claim 6 wherein said means to selectively apply magnetomotive forces to a desired ring to drive it to a desired saturation polarity includes (1) a plurality of row coils each of which is inductively coupled to a different ring on every tube, each of said row coils including a wire passing into a perforation in one space between two rings and out of a perforation in an adjacent space to the perforation in a succeeding tube, (2) a plurality of column coils each of which is inductively coupled to all the rings on a tube, and (3) means to selectively apply exciting currents to one of said row coils and one of said column coils to drive to a desired saturation polarity only the ring which is coupled to both said excited row and column coils.

8. A magnetic matrix memory as recited in claim 6 wherein said means to detect the saturation polarity of a desired ring includes a coil inductively coupled to all the rings on all the tubes.

9. A magnetic matrix memory as recited in claim 7 wherein each of said plurality of column coils includes the walls of a tube which are made of a conductive material.

10. A magnetic matrix memory as recited in claim 7 wherein each of said plurality of column coils includes a wire passing through a tube longitudinally.

11. A magnetic matrix memory comprising a plurality of tubes each of which is made of an electrically conductive and substantially non-magnetic material, a plurality of rings of magnetic material about each of said tubes, each ring on a tube being spaced from another along said tube, a plurality of coils each of which is inductively coupled to a different ring on every tube, and a reading coil inductively coupled to every ring on every tube.

12. A unit for a magnetic system comprising a tube of electrically conductive and substantially non-magnetic material, and a plurality of rings of magnetic material on said tube, each of said rings being spaced from the other along said tube, the wall of said tube having openings adjacent each said ring for inductively coupling to said rings.

13. In a magnetic matrix system, the combination comprising a plurality of tubes each of which is made of an electrically conductive and substantially non-magnetic material, a plurality of rings of magnetic material about each of said tubes, each ring on a tube being spaced from another along the same tube, and a plurality of selecting coils each coupled to rings on different said tubes.

14. In a magnetic matrix system, the combination comprising a plurality of tubes each of which has a wall made of an electrically conductive and substantially non-magnetic material, each said wall having openings, a plurality of rings of magnetic material about each of said tubes, each ring on a tube being spaced from another along the same tube, and a plurality of selecting coils each coupled to rings on different said tubes by being threaded through different said wall openings.

15. In a magnetic matrix system, the combination comprising a tube having a wall made of an electrically conductive and substantially non-magnetic material, said wall having openings, a plurality of rings of magnetic material about said tube, each ring being spaced from another along said tube, and a plurality of selecting coils each coupled to different said rings by being threaded through different said wall openings.

References Cited in the file of this patent

UNITED STATES PATENTS

| | | |
|---|---|---|
| 343,602 | Pfannkuche | June 14, 1886 |
| 675,106 | Oberle | May 28, 1901 |
| 2,113,083 | Height | Apr. 5, 1938 |
| 2,531,820 | Lindenblad | Nov. 28, 1950 |